(12) United States Patent  (10) Patent No.: US 9,440,487 B2
Gafni  (45) Date of Patent: Sep. 13, 2016

(54) CARDBOARD MADE WHEEL

(71) Applicant: I.G. CARDBOARD TECHNOLOGIES LTD., Tel Aviv (IL)

(72) Inventor: Izhar Gafni, Ahituv (IL)

(73) Assignee: I.G. CARDBOARD TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 14/766,399

(22) PCT Filed: Nov. 3, 2014

(86) PCT No.: PCT/IL2014/050952
§ 371 (c)(1),
(2) Date: Aug. 6, 2015

(87) PCT Pub. No.: WO2015/104701
PCT Pub. Date: Jul. 16, 2015

(65) Prior Publication Data
US 2015/0375562 A1 Dec. 31, 2015

Related U.S. Application Data

(60) Provisional application No. 61/926,651, filed on Jan. 13, 2014.

(51) Int. Cl.
*B60B 5/00* (2006.01)
*B60B 3/00* (2006.01)
*B60B 3/02* (2006.01)
*B60B 1/00* (2006.01)

(52) U.S. Cl.
CPC ............... *B60B 3/001* (2013.01); *B60B 3/02* (2013.01); *B60B 5/00* (2013.01); *B60B 1/003* (2013.01); *B60B 1/006* (2013.01); *B60B 2360/94* (2013.01); *B60B 2900/111* (2013.01); *B60Y 2200/13* (2013.01)

(58) Field of Classification Search
CPC ......... B60B 3/001; B60B 3/02; B60B 3/082; B60B 3/10; B60B 5/00
See application file for complete search history.

(56) References Cited

U.S. PATENT DOCUMENTS 1,639,570 A * 8/1927 Dashwood ................ B60B 5/04
301/64.6
2,326,027 A * 8/1943 Sidney .................... A63H 19/15
446/470

(Continued)

FOREIGN PATENT DOCUMENTS

CN 201619390 U 11/2010
CN 204820928 U 12/2015

(Continued)

OTHER PUBLICATIONS

Feb. 18, 2015 International Search report issued in International Application No. PCT/IL2014/050952.

(Continued)

*Primary Examiner* — Kip T Kotter
(74) *Attorney, Agent, or Firm* — Kenealy Vaidya LLP

(57) ABSTRACT

Some embodiments are directed to a generally planar wheel, including a multi-layer cardboard body having at least one layer of a high-density cardboard sheet sandwiched between at least two layers of low-density cardboard sheet.

16 Claims, 7 Drawing Sheets

(56) References Cited

U.S. PATENT DOCUMENTS

| | | | |
|---|---|---|---|
| 2,393,776 A * | 1/1946 | Horr | F41J 1/08 |
| | | | 273/348 |
| 3,135,527 A * | 6/1964 | Knapp | B62B 1/12 |
| | | | 280/14 |
| 3,492,016 A | 1/1970 | O'Connor et al. | |
| 4,863,207 A | 9/1989 | Wackerle et al. | |
| 5,540,485 A | 7/1996 | Enders | |
| 8,662,513 B2 * | 3/2014 | Gafni | B62K 3/10 |
| | | | 280/200 |
| 2011/0133427 A1 | 6/2011 | Bashan et al. | |
| 2014/0027991 A1 * | 1/2014 | Kainen | B62B 3/005 |
| | | | 280/47.34 |

FOREIGN PATENT DOCUMENTS

| | | | | |
|---|---|---|---|---|
| DE | 20009700 U1 | 9/2000 | | |
| GB | 190920606 A * | 0/1910 | | A63C 17/22 |
| GB | 2471309 A * | 12/2010 | | B65D 5/4208 |
| JP | 62258801 A | 11/1987 | | |
| JP | 03240524 A | 10/1991 | | |
| JP | 10272901 A | 10/1998 | | |
| JP | 2012213418 A * | 11/2012 | | |
| WO | 2011067742 A1 | 6/2011 | | |
| WO | 2012172478 A1 | 12/2012 | | |

OTHER PUBLICATIONS

Feb. 18, 2015 Written Opinion of the International Searching Authority report issued in International Application No. PCT/IL2014/050952.

Viva Sarah Press; "Nimrod Elmish Interview—Cardboard wheelchair to roll out from Israel"; Israel 21c; Published: Oct. 28, 2012 (http://www.israel21c.org/cardboard-wheelchair-to-roll-out-from-israel/).

* cited by examiner

CARDBOARD MADE WHEEL

CROSS REFERENCE TO RELATED APPLICATION

This application is a National Phase filing under 35 C.F.R. §371 of and claims priority to PCT Patent Application No.: PCT/IL2014/050952, filed on Nov. 3, 2014, which claims the priority benefit under 35 U.S.C. §119 of U.S. Provisional Application No. 61/926,651, filed on Jan. 13, 2014, the contents of which are hereby incorporated in their entireties by reference.

TECHNOLOGICAL FIELD

The present invention concerns a wheel for use in bicycles and other land vehicles.

BACKGROUND

PCT Application WO 2011/067742 discloses a human-powered land vehicle, such as a bicycle, which is structured from palpable recyclable material, having wheels that may be made of cardboard. Cardboard-based wheels have also been disclosed in Publication U.S. Pat. No. 3,492,016.

GENERAL DESCRIPTION

The present invention provides a wheel that is made substantially out of cardboard, has sufficient rigidity to support a load and can, thus, be used in a land vehicle, such as a bicycle.

The term "made substantially out of cardboard" means to denote that cardboard is the main structural component of the wheel that functions to support the load exerted on the portion of the wheel that bears on the ground or on another driving/riding surface. For example, a wheel that is made substantially out of cardboard may have a hub that incorporates the wheel's axle that will be made of a material other than cardboard, it may comprise coating layers that line portions of the wheel's external surfaces (at times the entire surface) for environmental protection, e.g. a polymeric film layer, lacquer, etc.

Typically, but not exclusively, the wheel of the invention is fitted with a tire or an elastomeric, ground-bearing material on its rim. In the following, the term "tire" will be used to refer, collectively, to an elastomeric, ground-bearing element that is fitted around the wheel's rim. The tire may, for example, be a solid mass of an elastomeric material, may be inflatable, may be an elastomeric strip fitted on the rim, etc. As is well known in the tire industry, tires may at times comprise also reinforcing metal or non-metallic fibers or mash, may have a treading pattern, etc.

In accordance with the invention, it has been realized that a multi-layered cardboard structure having at least one high density cardboard (hereinafter, at times, "HDC") layer and at least two layers of low density cardboard (hereinafter, at times, "LDC") sandwiching the HDC layer, forms a robust and relatively light structure that has significant compression resistance as well as torsional and flexural resistance. Such a structure having a rounded circumference, arranged around the central hub, allows it to be used as a wheel in a bicycle or other land vehicle with sufficient rigidity which, in the case of a bicycle, is sufficient to bear the weight load of a rider.

There is, of course, a correlation between the load-bearing capacity and the service lifetime of such a wheel, on the one hand, and the type of HDC and LDC used for forming such layers. It would be a relatively routine undertaking that would not require undue experimentation, to find out the optimal combination (in terms of weight and rigidity) of HDC and LDC for a specific use. For example, a wheel intended for a children's bicycle may be constructed of thinner HDC layers, or a less dense LDC layer than for a bicycle intended for adults.

The term "resistance" should be understood in the context of use of the wheel and is intended to denote that, during regular use and stress, encountered during riding/driving, the wheel maintains its integrity as well as its generally planar and rounded structure.

The term "high density cardboard" or "HDC" is intended to denote a cardboard sheet in which the cardboard is packed without visible voids or gas-containing pockets. A high density cardboard sheet typically has an areal density in the range of 400 to 600 $g/m^2$. A particular example is heavy duty cardboard having a density in the range of 500 to 600 $g/m^2$. The HDC used in accordance with the invention may have a thickness in the range of 0.5 to 3 mm, typically 1 to 1.5 mm.

The term "low density cardboard" or "LDC" refers to cardboard sheets having internal structure defining a plurality of cells or voids, e.g., formed by corrugated, fluted or otherwise loosely packed paper sheets or strips that define a plurality of voids therebetween, and comprising one or more liner cardboard sheets lined at one side or both sides of the low-density layers (namely sandwiching the low-density layer between them). Examples of such cardboard panels are such known as "corrugated cardboard", which consists of a fluted or corrugated paper panel(s) or strip and one or two flat linerboards at one or both (i.e. sandwiching) sides of the fluted or corrugated paper; and may also be such referred to as "honeycomb cardboard". The corrugated or honeycomb cardboard sheets may be single-walled or multi-walled cardboard sheets. These terms are also meant to encompass cardboard of various strengths, ranging from a simple arrangement of a single thick panel of paper to complex configurations featuring multiple corrugated, honeycomb and other layers.

The LDC is typically a honeycomb or corrugated cardboard having a thickness in the range of 8 to 20 mm, typically 8 to 15 mm and even 8 to 12 mm.

The invention, thus, provides a wheel that comprises a generally planar, multi-layered cardboard body defined between two side faces, and having circular circumference and a hub that defines its central axis. The layers are arranged parallel to the two side faces. The layers comprise at least one layer of HDC and at least two layers of LDC sandwiching the HDC layer. The at least two LDC layers and the at least one HDC layer are fixedly attached to one another. The fixed attachment is typically by gluing.

By one embodiment, the wheel includes a single HDC at the wheel's mid-line with two LDC layers sandwiching this single high density cardboard layer. Typically, a wheel with such embodiment would have axial symmetry about the HDC layer. However, other embodiments may also be envisaged, in accordance with the general teachings of the invention. By way of example, there may be alternating layers of high and low density cardboard, e.g. the following layer arrangement: one with a plurality of alternating LDC-HDC layers, for example: LDC-HDC-LDC-HDC-LDC; or HDC-LDC-HDC-LDC-HDC; or the same layer structure with additional, respective, HDC or LDC layers at each side of these structures; etc. By other examples, the HDC layer at the mid-line may consist of two or more HDC sheets fixedly attached to one another, forming a thicker HDC mid-line layer; or one or more LDC layers may be formed by two or more LDC sheets.

By one embodiment, the wheel comprises one or more pliable strips that are fitted around the circumference of said body, in fact defining the perimeters of the cardboard body. Such a strip may typically be made of cardboard or paper but other materials, such as plastic, rubber or other polymeric material, may also be used.

Such a strip, particularly where it is made of cardboard, typically comprises lateral flaps that are folded and attached to the wheel's side faces thereby securing the strip in position and providing further reinforcement to the structure.

By one embodiment the body of the wheel is a continuous mass extending from the hub to the circumference. By another embodiment said body is patterned by cutouts defining arms with side and inner faces extending radially between the hub and a circumferential wheel portion. Such inner faces may be overlaid with a pliable sheet, e.g. cardboard or paper. Such a patterned wheel configuration, define also inner faces of the circumferential wheel portion, which by one embodiment are also overlaid with a pliable sheet, e.g. cardboard or paper.

The wheel, as noted above, is typically fitted with a tire.

For environmental, in particular water-resistance, the wheel's external faces may be impregnated, e.g. by a water repelling material or coated by such a material. Examples are resins such as lacquer or epoxy, a polymeric sheet, a combination of these, etc.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
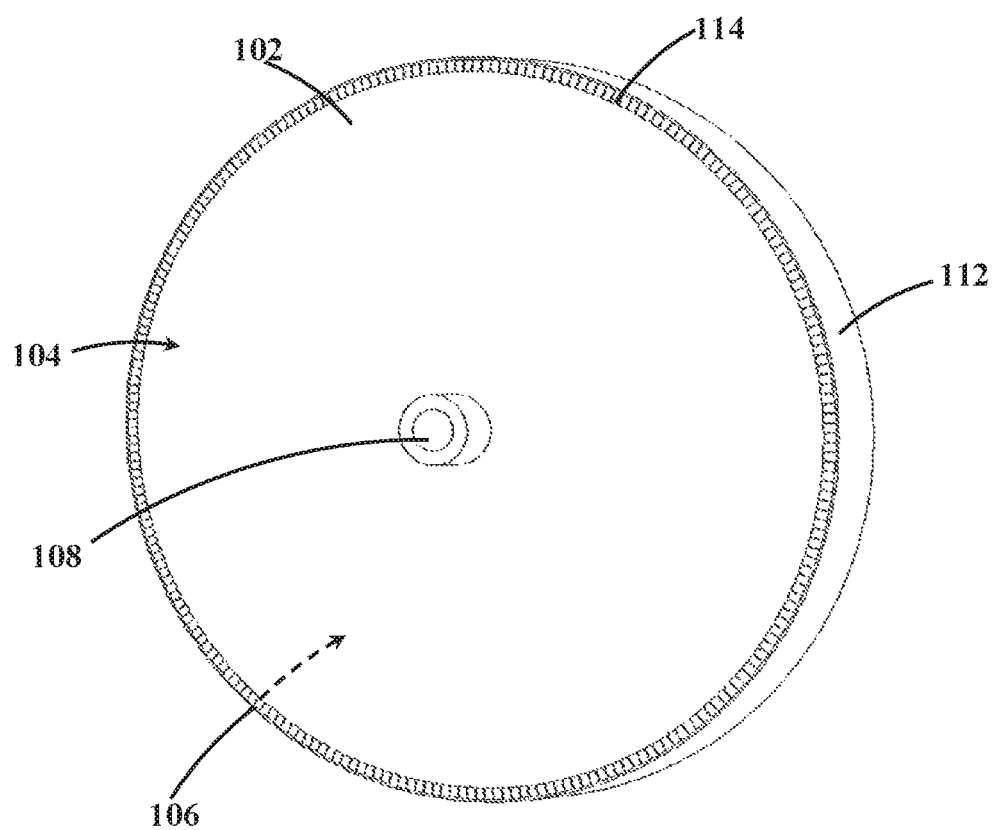
FIG. 1 shows a perspective view of a wheel in accordance with an embodiment of the invention.

Referring first to FIG. 1, shown is a wheel which has a generally planar configuration and has a cardboard body 102 with two side faces 104 and 106. As inherent in a wheel structure, it has a circular circumference and a hub 108 that defines the wheel's central axis. The cardboard body, as can be seen in FIG. 4 and as will be elaborated upon further below, has layered structures, the layers being arranged in parallel to the two side faces.

The wheel of FIG. 1 is made substantially out of cardboard, although the hub may be made of other materials, such as plastic, wood, metal, may comprise ball bearings, etc. The hub may be incorporated into the wheel by forming a circular cut-out in body 102 and fitting the hub element 108 into it, tightly attaching it to the body, e.g. through gluing.

Figure 2:
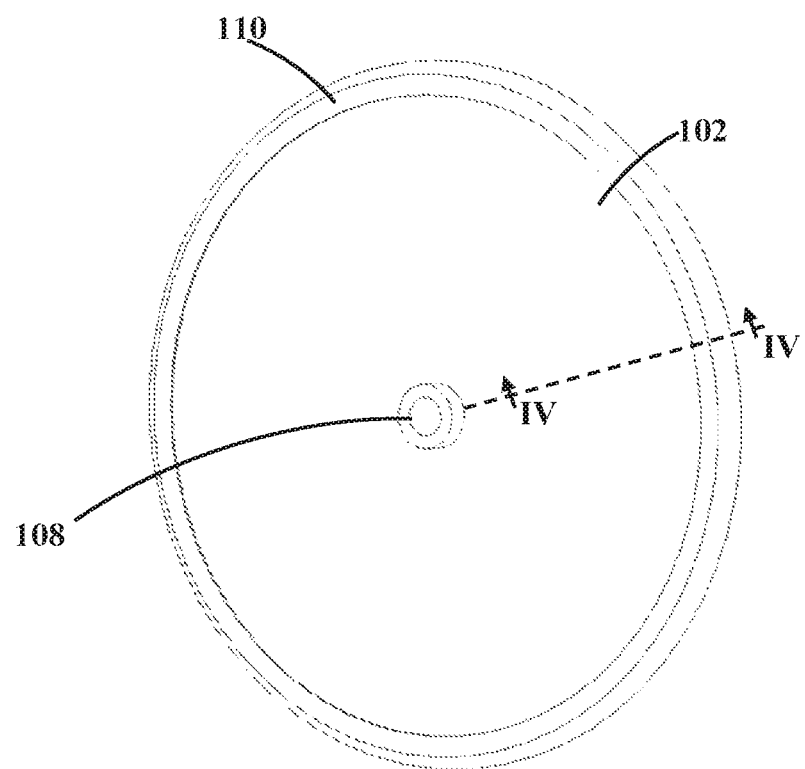
FIG. 2 shows the wheel of FIG. 1 fitted with a tire.

As can be seen in FIG. 2, the wheel is typically fitted with a tire 110 made of rubber or another elastomer. In the embodiment seen in FIG. 2, the tire is a solid elastomeric mass, but according to other embodiments the tire may be a foamed mass, may be inflatable, may be of reinforced rubber, or may have a variety of other structures.

As can further be seen in FIG. 1, the circumference of body 102 is fitted with a pliable strip 112, typically made of cardboard, paper or a polymeric film, having flaps 114 that are folded onto side faces 104 and 106 to secure the strip in position. This strip, among others, seals the otherwise exposed perimeter of the layered structure.

Typically, the wheel will be covered by an environmentally protected layer, e.g. polymeric resin, polymeric layer, epoxy, lacquer, paint, etc.

Figure 3:
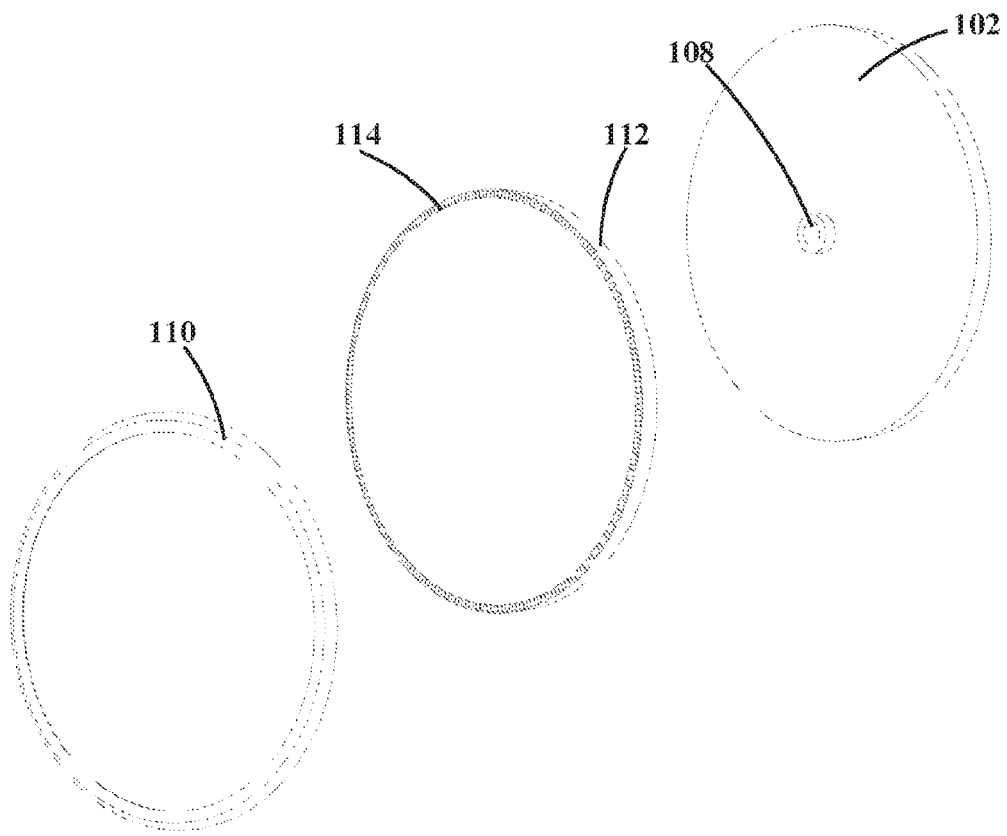
FIG. 3 is an exploded perspective view of the wheel of FIG. 2 showing its constituting elements.

The exploded view of the wheel of FIG. 2 can be seen in FIG. 3, showing the four basic constituting elements which are the hub 108, body 102, strip 112 and tire 110.

Figure 4A:
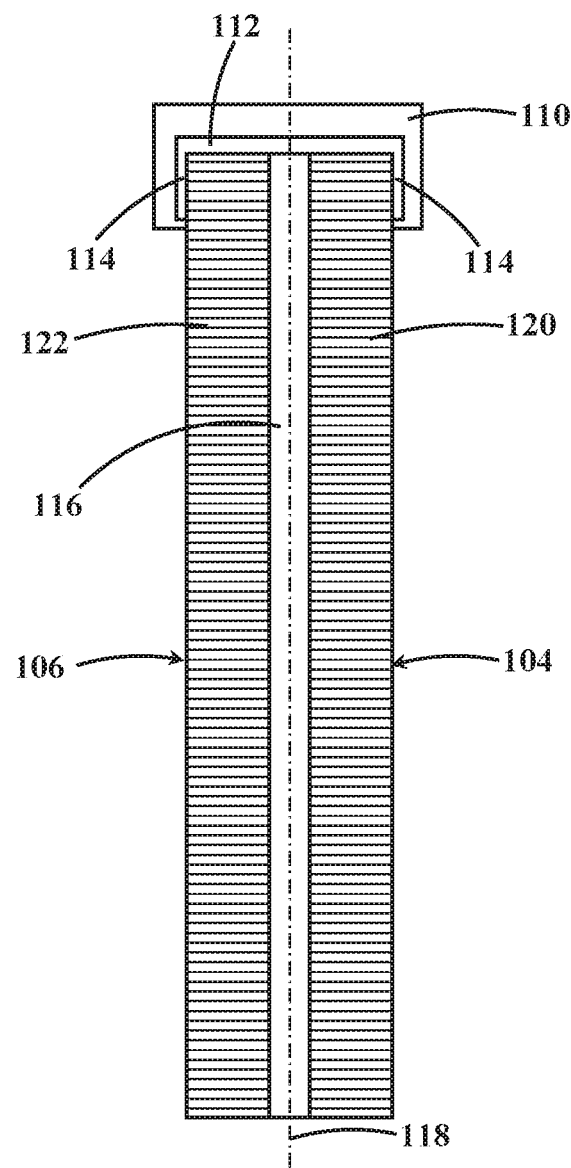
FIG. 4A is a cross-section along lines IV-IV in FIG. 2.

FIG. 4A shows a cross-section through the wheel of FIG. 2. As can be seen, the layers include an inner HDC layer 116 defining a mid-line 118. The HDC layer 116 is sandwiched by two LDC layers 120 and 122, arranged symmetrically about it. The HDC typically is made of high density or heavy duty cardboard having a thickness in the range of 0.5-3 mm, typically of about 1-1.5 mm; while the LDC layers are typically corrugated or honeycombed cardboard having a thickness in the range of 8-20 mm, typically of about 12 mm.

As can further be seen in FIG. 4A, the pliable strip 112 that surrounds the wheel's circumference is overlaid with a tire 110.

Figure 4B:
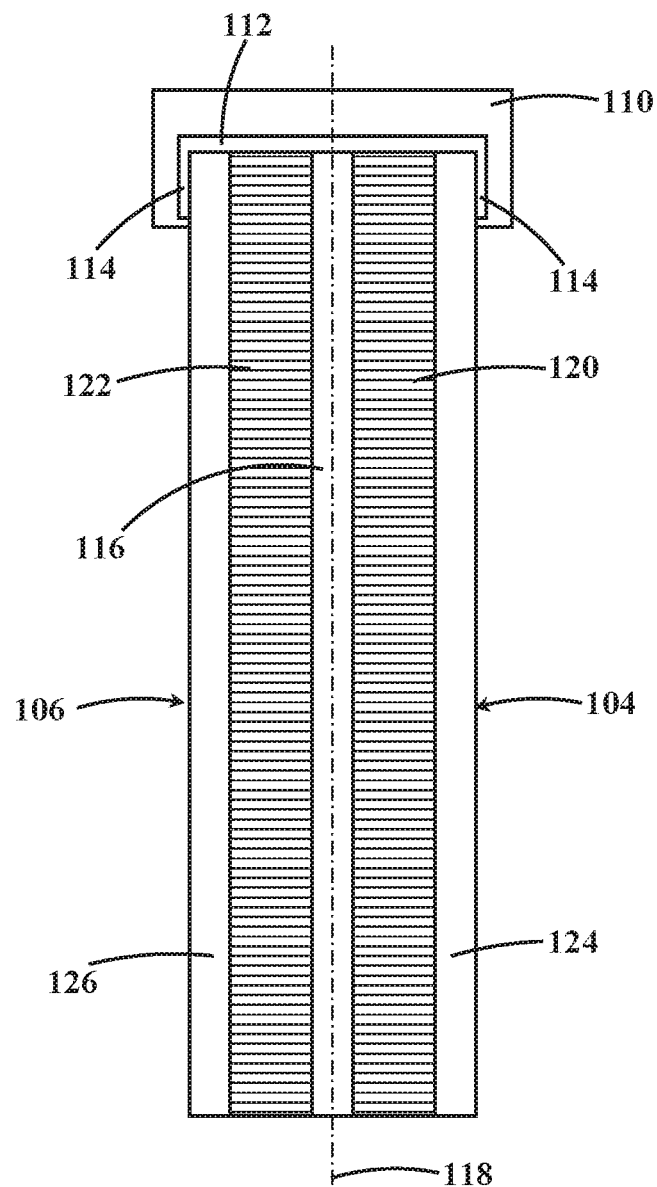
FIG. 4B shows a layered structure according to another embodiment of the invention.

Another embodiment of a cardboard body for use in a wheel can be seen in FIG. 4B. In this embodiment, two additional HDC layers 124 and 126 sandwich the two LDC layers. It should, however, be noted that the two embodiments illustrated in FIGS. 4A and 4B are mere examples and other different embodiments, e.g. those noted above in the summary, may be used in accordance with the invention.

Figure 5:
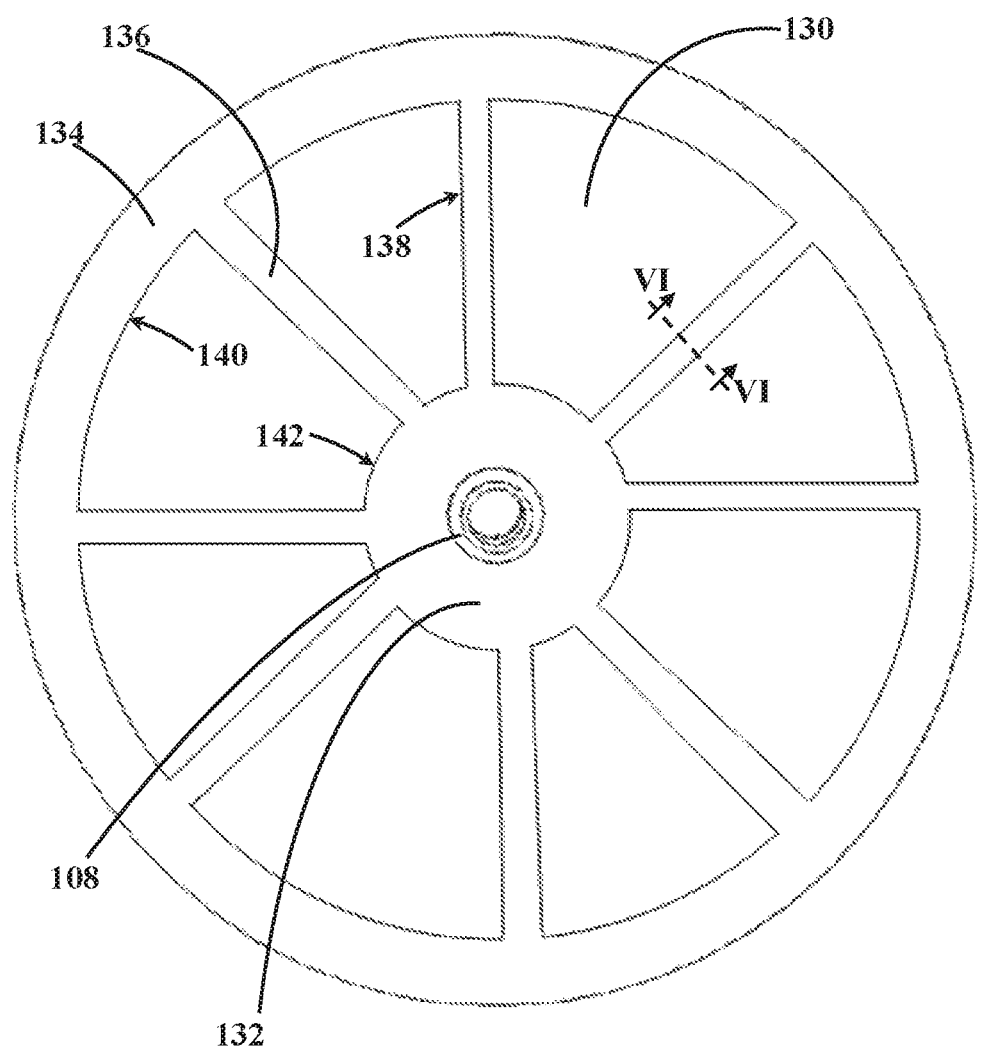
FIG. 5 shows a side view of a wheel according to another embodiment, patterned through cut-outs.

The wheel according to another embodiment is illustrated in FIG. 5. The wheel of FIG. 5 is based on that of FIG. 1 and is patterned through cut-outs 130 that together define an enlarged hub portion 132 linked to a peripheral portion 134 through radial arms 136. Inner faces 138 of arms 136, inner faces 140 of peripheral portion 134, as well as inner face 142 of hub portion 132, are typically lined with a liner layer which may be identical in constitution to that of strip 112.

Figure 6:
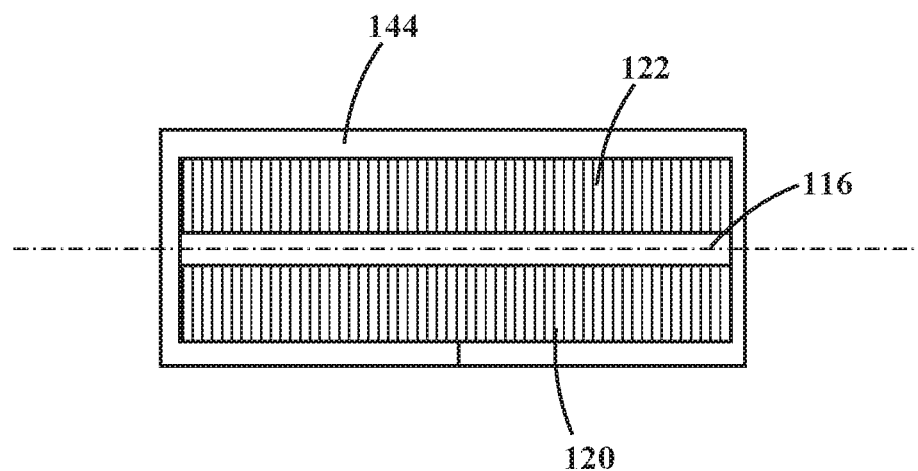
FIG. 6 is a cross-section along lines VI-VI in FIG. 5.

As can be seen in FIG. 6, arm 136 is enveloped by a layer 144. However, in other embodiments, rather than enveloping the entire arm, a strip of such pliable material may be fitted only on the inner faces, e.g. in a similar manner as in the case of strip 112, by deploying, for example, flaps to fix the strips in position.

The invention claimed is:

1. A wheel, comprising:
a generally planar, multi-layer cardboard body having two side faces, a circular circumference and a hub that defines a central axis, the layers being arranged in parallel to the two side faces;
the layers comprising at least one layer of a high-density cardboard sheet sandwiched between at least two layers of low-density cardboard sheet, each of said low-density cardboard sheet comprising two liner cardboard layers fitted on opposite sides of a low-density cardboard layer;
the at least two layers of low-density cardboard sheet and the at least one layer of high-density cardboard sheet being fixedly attached to one another.

2. The wheel of claim 1, wherein the at least one layer of a high-density cardboard sheet comprises a high-density layer disposed at an axial midline of the wheel.

3. The wheel of claim 2, wherein the wheel has an axial symmetry about said high-density layer.

4. The wheel of claim 2, wherein the at least two layers of low-density cardboard sheet comprise two layers of low-density cardboard sheet symmetrically fitted about said high-density layer.

5. The wheel of claim 1, comprising one or more pliable strips fitted around the circumference of said body.

6. The wheel of claim 5, wherein said strip is made of cardboard or paper.

7. The wheel of claim 5, wherein said strip comprises lateral flaps that are folded and attached to the wheel's side faces.

8. The wheel of claim 1, wherein said body is a continuous mass extending from the hub to the circumference.

9. The wheel of claim 1, wherein said body is patterned by cutouts defining arms with side and inner faces extending radially between the hub and a circumferential wheel portion.

10. The wheel of claim 9, wherein the inner faces of said arms are overlaid with a pliable sheet.

11. The wheel of claim 10, wherein the pliable sheet comprises cardboard or paper.

12. The wheel of claim 10, wherein inner faces of the circumferential wheel portion are overlaid with a pliable sheet.

13. The wheel of claim 12, wherein the pliable sheet comprises cardboard or paper.

14. The wheel of claim 1, wherein the wheel's circular circumference is fitted with a tire or a surface-engaging body.

15. The wheel of claim 14, wherein the surface-engaging body is made of an elastomer.

16. The wheel of claim 1, being coated by liquid impermeable material.

* * * * *